(12) United States Patent
Morita

(10) Patent No.: US 6,320,643 B1
(45) Date of Patent: Nov. 20, 2001

(54) IMAGE RECORDING APPARATUS

(75) Inventor: Naoyuki Morita, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/228,393

(22) Filed: Jan. 12, 1999

(30) Foreign Application Priority Data

Jan. 12, 1998 (JP) .................................................. 10-003968

(51) Int. Cl.$^7$ .......................... G03B 29/00; G03B 27/52; G03B 27/44; G03B 27/32
(52) U.S. Cl. ................................. 355/29; 355/40; 355/46; 355/27
(58) Field of Search .................................. 355/27, 28, 29, 355/40, 41, 42, 43, 46, 97; 358/22; 396/612, 622

(56) References Cited

U.S. PATENT DOCUMENTS

| | | | |
|---|---|---|---|
| 5,117,283 | * 5/1992 | Kroos et al. | ............................. 358/22 |
| 5,923,410 | * 7/1999 | Kohda et al. | ............................ 355/97 |
| 5,929,975 | * 7/1999 | Matsumoto | ............................. 355/46 |
| 5,993,083 | * 11/1999 | Tsuzawa | .................................. 355/27 |
| 6,048,111 | * 4/2000 | Kurumisawa et al. | ................. 355/27 |

\* cited by examiner

Primary Examiner—Russell Adams
Assistant Examiner—Peter B. Kim
(74) Attorney, Agent, or Firm—Sughrue, Mion, Zinn, Macpeak & Seas, PLLC

(57) ABSTRACT

There is provided an image recording apparatus comprising a light-sensitive material supply section, a light-sensitive material transport mechanism, an image recording section, a cutter, a distributor, a scan/transport section and an exposing unit, wherein a light-sensitive material supplied as cut sheets is distributed in a plurality of rows and digitally exposed at a time for a plurality of images and the cut sheets of the exposed light-sensitive material are delivered to a subsequent developing apparatus by the light-sensitive material transport mechanism. The productivity of the digital photoprinter is improved when a multiplicity of the cut sheets of the light-sensitive material are exposed.

21 Claims, 2 Drawing Sheets

IMAGE RECORDING APPARATUS

BACKGROUND OF THE INVENTION

The present invention relates to the technical field of an image recording apparatus for supplying an elongated roll-shape light-sensitive material as cut sheets having been cut to a specified length, digitally exposing the cut sheets of the light-sensitive material for a specified image acquired as digital image data and delivering the exposed light-sensitive material to the next developing apparatus.

Most of the images took on photographic films such as negatives, reversals and the like (which are hereinafter referred as "films") are conventionally printed (exposed) onto light-sensitive materials such as photographic papers by "direct (analog) exposure" in which the image of a film is projected onto the light-sensitive material for a real exposure. Whereas, at present, digital photoprinters have been commercialized. In the digital photoprinters, the image information recorded on, for example, a film is photoelectrically read and converted into digital signals, which are subjected to various kinds of image processing (data processing) to produce recording image data; a light-sensitive material is exposed by scanning with recording light modulated in accordance with the image data; and an image (latent image) is formed on the light-sensitive material and developed and then the light-sensitive material is output as a finished print (photograph).

In the digital photoprinters, the image information on the film is photoelectrically read and gradation correction and other adjustments, are performed by subsequent image processing to determine exposing conditions. Hence, the digital photoprinters have many capabilities in various kinds of image processing such as editing of printed images by, for example, combining a plurality of images or splitting a single image into plural images, as well as color and density adjustment and edge enhancement; as a result, prints can be output as needed by specific uses. In addition, the image data on a printed image can be supplied to a computer and the like and stored in a recording medium such a floppy disk or the like.

A further advantage of the digital photoprinters is that it can output prints of higher image quality in such aspects as resolution, color and density reproduction as compared to the prints produced by the conventional method of direct exposure.

Such digital photoprinters are essentially composed of an input machine, an output machine and a controller wherein the input machine includes an image reading apparatus (scanner) for reading image data recorded on a film, a data processing apparatus for subjecting the image data read by the image reading device to various kinds of image processing (data processing) and the like; the output machine includes an image recording apparatus (printer) comprising a light-sensitive material supply section, a transport mechanism for transporting the light-sensitive material supplied from the light-sensitive material supply section, an image recording section for digitally exposing the light-sensitive material in accordance with the image data having been subjected to the image processing and the like, and a developing apparatus (processor) for developing the exposed light-sensitive material; and the controller controls and manages the digital photoprinter as a whole.

First, in the input machine, when the image data recorded on, for example, the film is read by the image reading device, the reading light issuing from an illuminant is allowed to be incident on the film; projected light that carries the image took and recorded on the film is focused on an image sensor such a CCD sensor or the like through an imaging lens; the image sensor performs photoelectric conversion to read the image, which is supplied to the data processing apparatus as input image data corresponding to the image recorded on the film after it is subjected to various kinds of image processing when necessary.

Subsequently, the data processing apparatus subjects the image data which was input from the image reading apparatus and converted to digital data or the image data which was previously converted to digital data before being input to various kinds of data processing steps according to image processing conditions previously set, or various kinds of image processing conditions which are changed in accordance with the indication from an operator or the image data, and determines exposing conditions suitable for the image data. The image data is transported to the image recording apparatus of the output machine as output image data.

In the output machine, if the image recording apparatus is of a type that relies upon exposure by scanning with an optical beam, the light beam is modulated in accordance with the image data transferred from the data processing section and deflected in a main scanning direction; at the same time, the light-sensitive material is transported in an auxiliary scanning direction which is approximately perpendicular to the main scanning direction, whereby the light-sensitive material is two-dimensionally scanned and exposed so that a latent image is recorded on the light-sensitive material in the image recording section. The light-sensitive material on which the latent image is recorded is subjected to development processing in accordance with the light-sensitive material in the developing apparatus, thereby forming a visible image; the light-sensitive material is then washed and dried to be output as a finished print (photograph).

In the digital photoprinters making use of the digital exposure, the correction of gradation and the correction of color and density are carried out by the image processing before the exposing conditions are determined. Therefore, a time necessary to expose one image is shortened and an exposing time is constant in accordance with an image size. Accordingly, the digital photoprinters can perform exposure more promptly as compared with the conventional direct (analog) exposure. Further, the digital photoprinters can perform freely editing of printed images by combining a plurality of image or splitting a single image into plural images, and image processing such as the color and density adjustment and edge enhancement. Therefore, the digital photoprinters can output finished prints which were freely edited and image-processed depending on their use.

Moreover, since the image data of a finished print can be stored in a recording medium composed of a magneto/optic disk such as a floppy disk and the like, when the image data is stored in the recording medium, it is not necessary, for example, to read a film again or determine exposure conditions again in a job for producing extra prints, whereby the job can be very promptly and easily carried out. In addition, the digital photoprinters making use of the digital exposure is advantageous in such aspects as resolution, color and density reproduction and the like, because a print on which recorded image information is approximately completely reproduced can be output in the digital exposure, whereas it is difficult in a print made by conventional direct exposure.

Although the digital photoprinters have many advantages as described above, the price is inevitably expensive. Therefore, the digital photoprinters are still not competitive in cost performance over the conventional analog photoprinters which employ direct (analog) exposure in which the image of a film is directly projected onto a light-sensitive material for a real exposure.

When ordinary photographs are printed, many photographic papers of the same size such as an L-size are only exposed in many cases. On the other hand, photoprinters expose the same photograph to many photographic papers of the same size such as postcards with the photograph. However, the analog photoprinters have a problem that it must expose and print photographic papers one by one because only one original film such as a negative film is available. It is difficult to improve productivity in the analog photoprinters. Thus, there has been desired a digital photoprinter that has an excellent efficiency.

In particular, since many photographic papers must be exposed and printed for a short period of time in the case of postcards, there has been desired a more effective digital photoprinter.

In addition, it has been desired to shorten the processing time to improve productivity not only when photographic papers having the same image or the same size are exposed and printed but also when photographic papers of a different size are exposed and printed.

BRIEF SUMMARY OF THE INVENTION

In view of the above problems of the prior art, an object of the present invention is to provide an image recording apparatus for a digital photoprinter capable of digitally exposing a multiplicity of cut sheets of a light-sensitive material arranged in a plurality of rows at the same time for a plurality of the same or different images and of delivering the exposed light-sensitive material in the plurality of rows into the developing apparatus, making use of the feature of the digital exposure that printed images can be freely edited by combining a plurality of image or splitting a single image into plural images and so on, thereby improving the productivity of the digital photoprinter.

To achieve the above object, the present invention provides an image recording apparatus, comprising:

a light-sensitive material supply section for accommodating an elongated roll-shape light-sensitive material and supplying a light-sensitive material having been cut as cut sheets of a specified length;

a light-sensitive material transport mechanism for transporting the cut sheets of the light-sensitive material along a specified transport passage;

an image recording section provided in the specified transport passage of the light-sensitive material transport mechanism for digitally exposing the cut sheets of said light-sensitive material for specified images;

a cutter provided in said light-sensitive material supply section for cutting the elongated light-sensitive material to the out sheets of the light-sensitive material;

a distributor provided in the specified transport passage for distributing the cut sheets of the light-sensitive material in a plurality of rows;

scan/transport means provided in the image recording section for scanning and transporting the cut sheets of the light-sensitive material distributed in the plurality of rows; and an exposing unit provided in the image recording section for digitally exposing the cut sheets of the light-sensitive material at a time for the plurality of images, wherein the light-sensitive material supplied as said cut sheets is distributed in the plurality of rows and digitally exposed at a time for said plurality of images and the exposed light-sensitive material is delivered to a subsequent developing apparatus by said light-sensitive material transport mechanism.

It is preferred that said image recording apparatus further comprises aligning means for aligning the cut sheets of the light-sensitive material distributed in the plurality of rows by said distributor before the cut sheets of the light-sensitive material are digitally exposed by said image recording section.

It is preferred that said image recording apparatus further comprises a detection sensor provided for each of the plurality of rows near to said image recording section on upstream side thereof for detecting the cut sheet of the light-sensitive material distributed by said distributor and transported by said light-sensitive material transport mechanism and image data combining means for combining the image data of the respective images to be supplied for exposing the cut sheets of the light-sensitive material distributed in said plurality of rows based on differences of timing at which the respective rows of the cut sheets of the light-sensitive material distributed in the plurality of rows are detected.

Preferably, the specified images to be supplied for digitally exposing the cut sheets of said light-sensitive material by said image recording section include an image recorded on a film or an image recorded by a digital camera.

Preferably, the specified images to be supplied for digitally exposing the cut sheets of said light-sensitive material by said image recording section include a composite image made by combining the image recorded on the film or the image recorded by the digital camera with an image and a character image which were previously prepared.

Preferably, the light-sensitive material cut to the cut sheets is a light-sensitive material cut to cut sheets having the same specified length by said cutter.

Preferably, the specified images to be supplied for digitally exposing the cut sheets of the light-sensitive material distributed in said plurality of rows at a time are identical.

Preferably, the light-sensitive material cut to the cut sheets is a light-sensitive material cut to cut sheets for a postcard.

Preferably, the specified images to be supplied for digitally exposing the cut sheets of the light-sensitive material distributed in said plurality of rows at a time are identical and the light-sensitive material cut to the cut sheets is a light-sensitive material cut to cut sheets having the same specified length for a postcard.

DETAILED DESCRIPTION OF THE INVENTION

An image recording apparatus of the present invention will be described below in detail with reference to a preferable embodiment shown in the accompanying drawings.

Figure 1:
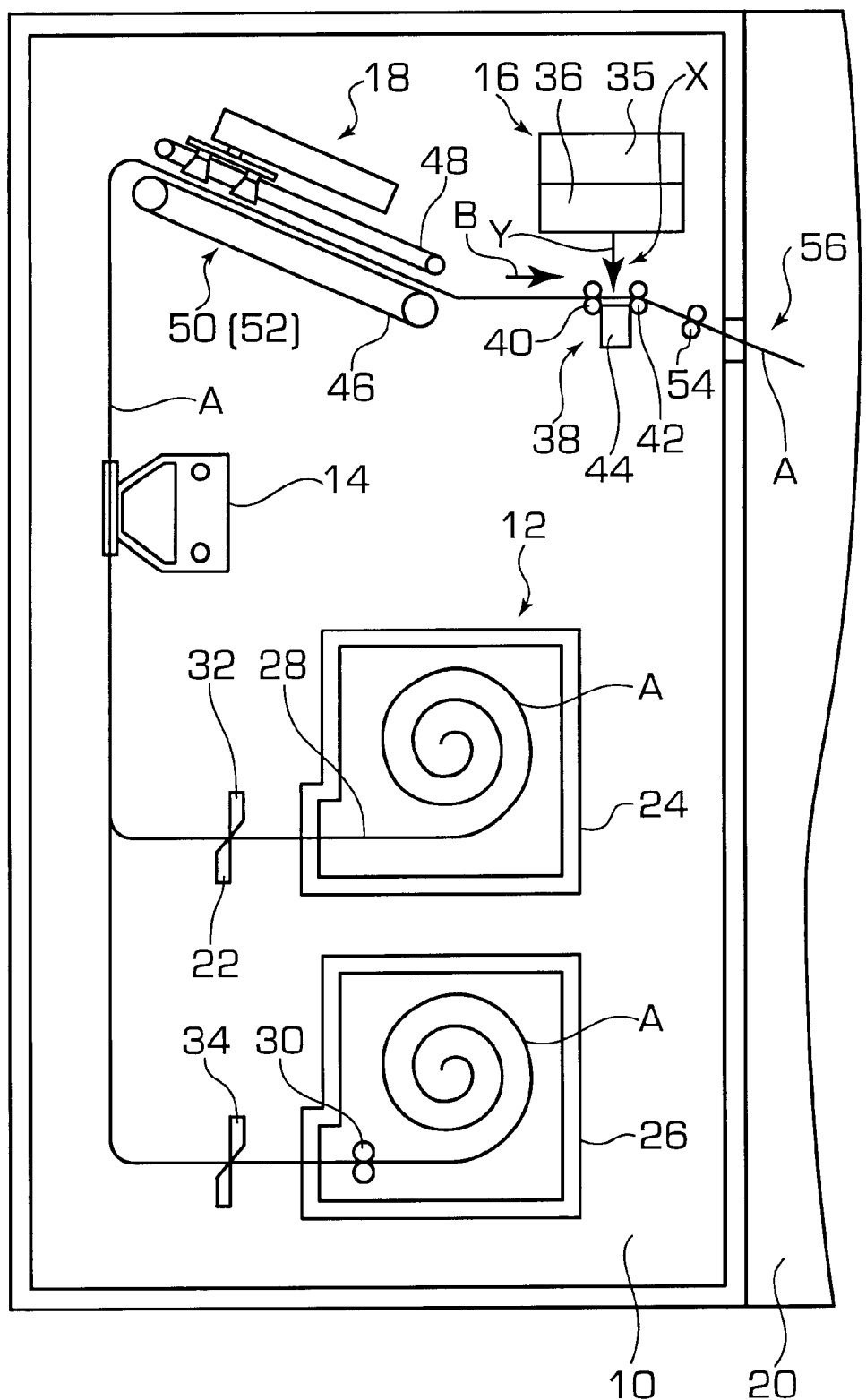
FIG. 1 is a schematic view of an embodiment in which the present invention is applied to a digital image recording apparatus.

FIG. 1 is a schematic view of the embodiment of the image recording apparatus of the present invention.

In the figure, the image recording apparatus (printer) 10 of the present invention operates as follows: an elongated roll-shape light-sensitive material A accommodated in magazines 24, 26 loaded on a light-sensitive material supply section 12 is cut to sheets of a specified length according to finished prints to be created, respectively by cutters 32, 34 thereafter the cut sheets of the light-sensitive material A are transported by a light-sensitive material transport mechanism 22; back print (recording of back print information) is performed on the cut sheets of the light-sensitive material A in a back print section 14 provided along the transport passage of the light-sensitive material transport mechanism 22; subsequently the cut sheets of the light-sensitive material A are distributed in a plurality of rows by a distributor 18; the cut sheets of the light-sensitive material A distributed in the plurality of rows are subjected to a simultaneous digital exposure (formation of latent images) for the images in a plurality of frames in an image recording section 16; then the cut sheets of the exposed light-sensitive material A are supplied to a developing apparatus (processor) 20.

The image recording apparatus 10 illustrated in FIG. 1 has the light-sensitive material transport mechanism 22 including a plurality of transport roller pairs as a transport means for transporting the cut sheets of the light-sensitive material A from the light-sensitive material supply section 12 to the image recording section 16 through the back print section 14 and the distributor 18 and transporting the cut sheets of the exposed light-sensitive material A to the developing apparatus 20.

The light-sensitive material transport mechanism 22 includes as required various kinds of known components to be provided in a light-sensitive material transport mechanism of an image recording apparatus such as a transport means of the cut sheets of the light-sensitive material A and various types of sensors. The transport means of the cut sheets of the light-sensitive material A constituting the light-sensitive material transport mechanism 22 is not limited to the aforementioned components and any known methods of transporting sheeting, such as a method using a belt conveyer or a nip belt, a method of lifting/transporting with suckers, etc. may be employed in stead of the method using the transfer roller pairs.

The magazines 24, 26 in which the elongated light-sensitive materials A are accommodated in a rolled state, are loaded on the light-sensitive material supply section 12.

Although the printer 10 has two magazines 24, 26 in the illustrated embodiment, the number of the magazines is not limited to two. The plurality of magazines 24, 26 accommodate a different type of the light-sensitive materials A which are different in a size (width), surface type (silk, matte, etc.) specifications (thickness, type, etc. of a base) and the like according to their purpose. When only one type of the light-sensitive material A is used, only one magazine may be loaded on the light-sensitive material supply section 12.

Each of the magazines 24, 26 loaded on the light-sensitive material supply section 12 is a light-proof case in which the elongated light-sensitive material A is accommodated in a rolled state with a recording surface (emulsion surface) facing outward. In the illustrated case, transport rollers 28, 30 which function as drawn out rollers are provided in the magazines 24, 26, to draw out the light-sensitive materials A, respectively. When the magazines 24, 26 are loaded at specified loading positions, the transport rollers 28, 30 are engaged with drive sources (not shown).

The elongated roll-shape light-sensitive materials A are drawn out of the magazines 24, 26 by the rotation of the transport rollers 28, 30; when transported downstream of the cutters 32, 34 in a transport direction by a distance corresponding to a specified-print size, the elongated light-sensitive materials A are stopped and cut by the cutters 32, 34 to produce the cut sheets, which are supplied to the light-sensitive material transport mechanism 22.

The cut sheets of the light-sensitive material A are exposed after being cut to various sizes. When the same-sized cut sheets of the light-sensitive material A are only exposed, all of them are supplied after being cut to the same size.

For example, when an image is recorded on a light-sensitive material for a postcard, a light-sensitive material of 102 mm wide is accommodated in the magazine and cut to sheets of 148 mm long. Further, in the photoprinter dedicated for L-size prints, a light-sensitive material of 89 mm wide is cut to sheets of 127 mm long.

Figure 3:
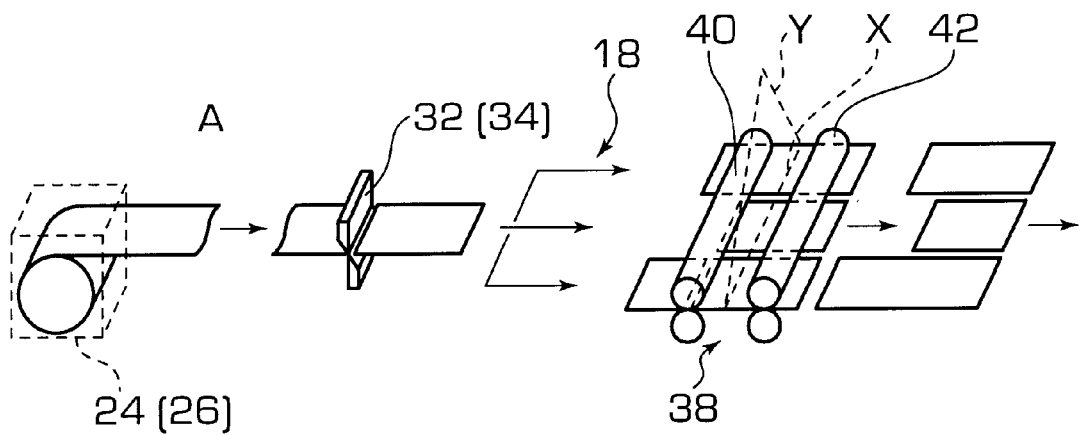
FIG. 3 is a conceptual view showing main processes in an expanded mode when different-sized cut sheets of the light-sensitive material are exposed at the same time in the embodiment of FIG. 1.

When panorama-size photographs, Hi-visions and the like which have recently become widespread are also included, the light-sensitive material is cut to different lengths in the transport direction and the different-sized cut sheets can be distributed in a multiplicity of rows to record images thereon as shown in FIG. 3.

The back print section 14 is provided downstream of the light-sensitive material supply section 12 in the transport direction as shown in FIG. 1. The back print section 14 records back print information including various kinds of information such as the date when a picture was taken, the date of printing, frame number, film ID number, ID number of the camera used to take the picture, ID number of the digital photoprinter, etc. on the back surface (non-emulsion surface) of the light-sensitive material A. The back print information is recorded on the cut sheets of the light-sensitive material in the back print section 14.

The type of the printer used in the back print section 14 is not particularly limited and printers used in known back printer such as a dot impact printer, a thermal transfer printer, an ink-jet printer, etc. can be used. However, a non-contact type recording method employing the ink-jet printer can be preferably employed and, in particular, an ink-jet printer using water non-soluble and heat-fusible ink which is in a solid state at normal temperature can be exemplified as a most preferable printer. Further, it is preferable to print characters on at least two lines in the back print section 14 to adopt the advance photo system.

Although the back print section 14 is provided upstream of the distributor 18 and the image recording section 16 in the embodiment illustrated in FIG. 1, the position of the back print section 14 is not limited thereto and it may be provided downstream of the distributor 18 or the image recording section 16, or two sections may be provided both upstream of the distributor 18 and downstream of image recording section 16. However, it is preferable to provide the back print section 14 upstream of the distributor 18, because if the back print section 14 is provided downstream of the distributor 18, the back print information must be printed on each of the cut sheets which were distributed in a plurality of rows by the distributor 18 and accordingly printers as many as the number of the rows of the cut sheets distributed by the distributor 18 must be provided, or a printer must be moved in a lateral direction (direction perpendicular to the transport direction) to successively print the back print information on the light-sensitive material.

In addition, the disposition of the back print section 14 downstream of the cutter 32 permits an idle space between the magazine 24 and the distributor 18 to be used effectively, whereby a space can be saved as a whole.

It should be noted that, when the back print section 14 is provided downstream of the image recording section 16, a back printer is provided only at a position to which the cut sheets of the light-sensitive material A having passed through the distributor 18 without being distributed are transported and the back print section 14 need not be provided upstream of the distributor 18. This arrangement can be applied to such a case that images are printed onto, for example, the postcards which can be effectively exposed in a plurality of rows at the same time and permit back print to be omitted because postal cards are attached to the back surfaces thereof. When ordinary prints are made in this arrangement using ordinary color negative films and reversal films, exposure may be made on photographic papers arranged in a single row and back print may be performed by the back print section 14 provided downstream of the image recording section 16. With the above arrangement, productivity can be greatly improved in printing postcards by simply improving the arrangement of an existing apparatus for ordinary prints.

The distributor 18 is provided downstream of the back print section 14.

The distributor 18 of the present invention distributes the cut sheets of the light-sensitive material A transported in a single row by the light-sensitive material transport mechanism 22 to form a plurality of rows in the transport direction, and supplies to the image recording section 16, thereby improving the throughput of the image recording section 16. In the illustrated embodiment, the distributor 18 includes a belt conveyer 46, an auxiliary belt conveyer 48, two sucking units 50, 52 each having two suckers connected to a sucking means (not shown), and the like.

The cut sheets of the light-sensitive material A having a back print recorded thereon are not transported by being pinched between the belt conveyer 46 and the auxiliary belt conveyer 48 but transported downstream by being placed on the belt conveyer 46.

The auxiliary belt conveyer 48 is provided on the center line of the belt conveyer 46 in the width direction thereof slightly apart from the belt conveyer 46. The auxiliary belt conveyer 48 depresses any curl of the cut sheet of the light-sensitive material A and assists the transport of the cut sheet of the light-sensitive material A by the belt conveyer 46 and sucking and holding thereof by the sucking units 50 and 52. The auxiliary belt conveyer 48 is composed of an endless belt having a narrow width so that even the cut sheet of the light-sensitive material A having a minimum size in a width direction can be sucked and held by the sucking units 50, 52.

The sucking units 50 and 52 are provided on both the sides of the auxiliary belt conveyer 48 in the width direction thereof, respectively. When the cut sheet of the light-sensitive material A is transported to a specified position by the belt conveyer 46 after the end of back printing, the sucking unit 50 located on the near side in the figure sucks and holds the cut sheet of the light-sensitive material A and slightly lifts to transport obliquely downstream to the right side (on the near side of the sheet surface in FIG. 1) with respect to the transport direction of the light-sensitive material A and releases the cut sheet of the light-sensitive material A from the sucking unit 50 to distribute to the light side. Likewise, the sucking unit 52 located on a far side distributes the cut sheet of the light-sensitive material A to the left side.

The cut sheets of the light-sensitive material A can be distributed to form three rows by sequentially repeating, for example, the distribution to the right side by the sucking unit 50, the distribution to the left side by the sucking unit 52 and the linear transport thereof without distribution. Otherwise, the cut sheets of the light-sensitive material A can be distributed in two rows by alternately distributing the cut sheets of the light-sensitive material A in the right direction and the left direction by the sucking units 50, 52. Further, the cut sheets of the light-sensitive material A can be also supplied to the image recording section 16 in a single row by linear transport without distribution.

It should be noted that the means for moving the sucking units 50, 52 is not particularly limited and there can be used various kinds of known methods utilizing, for example, a moving means making use of a link, a moving means making use of a cam and a moving means making use of a guide rail and a guide hole as well as suitable combinations thereof.

Further, the distributor 18 is not particularly limited and various kinds of methods of distributing sheeting in a plurality of rows can be used. More specifically, there can be exemplified a method of distributing the sheeting using a circular turret rotating about an axis, a method of dividing the transport means of the cut sheets of the light-sensitive material A into a plurality of blocks such as three blocks in the transport direction and distributing the cut sheets of the light-sensitive material A by laterally moving the central block thereof, and the like.

Further, in the image recording apparatus 10 of the present invention, the cut sheets of the light-sensitive material A of all the sizes are not always distributed in a plurality of rows and may be distributed in a different number of rows. For example, the cut sheets of the light-sensitive materials of 102 mm wide for postcard may be distributed in two rows and the cut sheets of the light-sensitive material of 89 mm wide for L-size print may be distributed in three rows.

The image recording section 16 is provided downstream of the distributor 18 in the transport direction.

The image recording section 16 projects recording light for scanning modulated in accordance with the output image data onto the cut sheets of the light-sensitive material A to perform digital exposure and includes an exposing unit 36 for scanning and exposing the cut sheets of the light-sensitive material A in a main scanning direction (direction perpendicular to the sheet in FIG. 1) and scan/transport means 38 for transporting the cut sheets of the light-sensitive material A at a constant speed in an auxiliary scanning direction (in the direction shown by an arrow B in the figure) which is approximately perpendicular to the main scanning direction.

The image recording section 16 is connected to the input machine having the not shown image reading apparatus and the not shown data processing apparatus.

In the image reading device, the reading light issued from an illuminant (not shown) is allowed to be incident on a film to thereby produce projected light that carries the image recorded on the film; the projected light is then passed through an imaging lens and focused on an image sensor such as a CCD sensor or the like which performs photoelectric conversion to read the image so that input image data corresponding to the image recorded on the film is input. Then, the input image data is supplied to the data processing apparatus after being subjected to various kinds of image processing when necessary.

The data processing apparatus subjects the image data which was input from the image reading apparatus and converted to digital data or the image data which was previously converted to digital data before being input to various kinds of data processing steps according to the image processing conditions previously set or various kinds of image processing conditions which are changed in accordance with the indication from an operator or the image data, and determines exposing conditions suitable for the image data, thereby producing the output image data.

The output image data to be supplied for exposing each of the cut sheets of the light-sensitive material A include digital image data from an image recorded on a film such as a negative film, a reversal film and the like, digital image data recorded by a digital camera, a digital video camera and the like, composite digital image data made by combining the above recorded digital image data, digital image data previously prepared and the digital image data of (bit-map developed) characters, for example, digital image data for postcard (with photograph) or proof, digital image data created by a computer, for example, graphics image data, and the like.

The image recording section 16 digitally exposes the cut sheets of the light-sensitive material A at an exposing position X shown in FIG. 1 based on the output image data.

The image recording section 16 edits image data of a plurality of frames of the film or image data of a plurality of images of a single frame, which corresponds to a plurality of prints for simultaneous exposure in a multi-image data combining unit 35, to obtain composite image data suitable for simultaneously exposing the cut sheets of the light-sensitive material A distributed in a plurality of rows in the image recording section 16. The composite image data is corrected for the scanning angle of recording light Y to be projected onto the cut sheets of the light-sensitive material A to obtain the output image data, which is used in the exposing unit 36 to expose the cut sheets of the light-sensitive material A.

Incidentally, whether the cut sheets of the light-sensitive material are same-sized or different-sized, when the cut sheets of the light-sensitive material A distributed in a plurality of rows and aligned for example by linearly arranging the forward ends thereof are simultaneously exposed, the image data to be supplied for the exposure of the respective cut sheets of the light-sensitive material A may be previously combined in the data processing apparatus of the input machine to produce the output image data for one image, so that combination and edition of the image data in the image recording section 16 may not be necessary. When the image data is previously combined by the data processing apparatus of the input machine to produce the output image data as described above, labor and necessity which is required in the image recording apparatus 10 and, in particular, in the image recording section 16 to combine the image data can be omitted, whereby the productivity of photo prints (exposing and printing operations) can be improved in the image recording apparatus 10. When the image data is combined, the output image data in the pixels where the cut sheets of the light-sensitive material A do not exist is preferably data having a light intensity with which the recording light does not turn on or to which the light-sensitive material A is not sensitive, or data corresponding to white (base density of the light-sensitive material A).

The exposing unit 36 is an optical beam scanner and comprises three illuminants which emit light beams for exposing the light-sensitive material A with red (R), green (G) and blue (B) lights, modulating means such as AOM (acoustic optical modulator) to modulate the light beams emitted from the illuminants in accordance with image data, a light deflector such as a polygonal mirror or the like to deflect the modulated light beams in the main scanning direction, an fθ (scanning) lens with which the light beams deflected in the main scanning direction are focused to form a beam spot of a specified diameter at a specified position on a exposing position (scanning line) X, and the like.

Aside from the optical beam scanner just described above, various kinds of digital raster exposing means using various arrays of light-emitting devices and spatial modulating devices which extend in a direction perpendicular to the direction in which the light-sensitive material A is transported for scanning can be used as the exposing unit 36. Specific examples of such arrays include a PDP (plasma display) array, an ELD (electroluminescent display) array, an LED (light-emitting diode) array, an LCD (light-crystal display) array, a DMD (digital micromirror device) array, and a laser array.

The scan/transport means 38 comprises two transport roller pairs 40, 42 which are provided on the opposite sides of the exposing position X, an exposure guide 44 for holding the cut sheets of the light-sensitive material A at the exposing position X with a higher accuracy, and the like and transports the cut sheets of the light-sensitive material A in the direction of the arrow B in FIG. 1.

Figure 2:
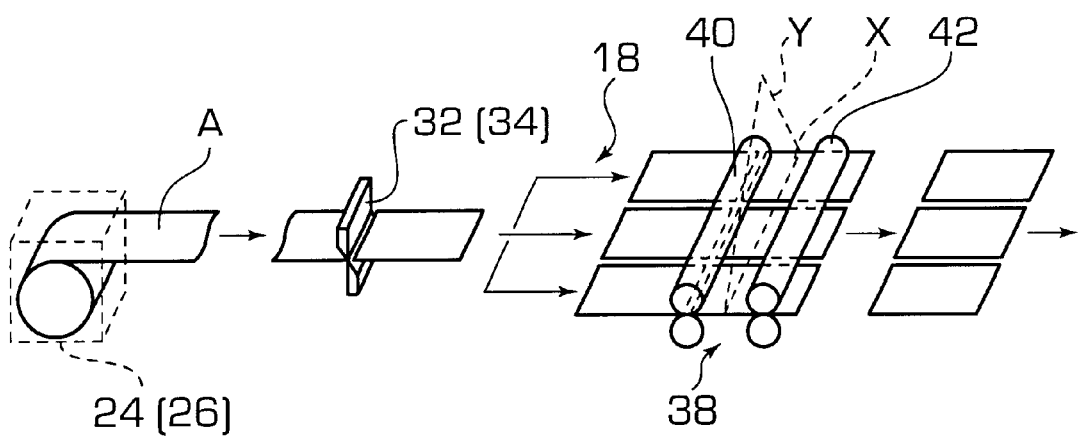
FIG. 2 is a conceptual view showing main processes in an expanded mode when a multiplicity of cut sheets of the same size of the light-sensitive material are exposed in the embodiment of FIG. 1.

As shown in FIG. 2, when the cut sheets of the light-sensitive material A cut to a specified length are exposed, the scan/transport means 38 transports the cut sheets of the light-sensitive material A arranged in a plurality of rows. When the cut sheets of the light-sensitive material A are held between the transport roller pair 40, top registering and side registering are executed in the cut sheets of the light-sensitive material A for correct positioning, so that the forward ends of the cut sheets arranged in the plurality of rows and the intervals therebetween can be correctly positioned. More specifically, the transport roller pair 40 functions as a register roller pair to align the forward ends of the cut sheets of the light-sensitive material A arranged in the plurality of rows.

Further, as shown in FIG. 3, when the different-sized cut sheets of the light-sensitive material A are exposed, the scan/transport means 38 aligns the forward ends of the cut sheets of the light-sensitive material A arranged in the plurality of rows by means of the transport roller pair 40 which functions as the register roller pair, and pinches and transports the cut sheets of the light-sensitive material A.

The transport roller pair 40 of the scan/transport means 38 are also used as the register rollers in the illustrated case. However, it is preferable to provide upstream of the transport roller pair 40 other register rollers used to perform top registration or side registration because the transport roller pairs 40, 42 are controlled in a complex manner to accurately scan and softly transport the cut sheets of the light-sensitive material A.

The scan/transport means 38 is not limited to the above arrangement and a scan/transport means using an exposing drum that transports the cut sheets of the light-sensitive material A as they are held in the exposing position X and two nip rollers which are provided on opposite sides of the exposing position X in such a way that they are held in contact with the exposing drum; a scan/transport means composed of an endless belt and two nip rollers; a scan/transport means composed of only an endless belt, and the like are preferably exemplified.

In the embodiment, the recording light Y modulated in accordance with the image data which was produced by combining and editing the image in the multi-image data combining unit 35 or the data processing apparatus of the input machine as described above and which was supplied for simultaneous exposure of a plurality of cut sheets to be printed, is deflected in the main scanning direction and projected onto the cut sheets of the light-sensitive material A; at the same time, the plurality of the cut sheets of the light-sensitive material A are transported by the transport roller pairs 40, 42 of the scan/transport means 38 in the auxiliary scanning direction which is approximately perpendicular to the main scanning direction along the exposure guide 44 while being held at the exposing position X, whereby the cut sheets of the light-sensitive material A are exposed by two-dimensional scanning to form latent images thereon.

At the time, since the cut sheets of the light-sensitive material A arranged in the plurality of rows are transported with the forward ends thereof being aligned as described above, the plurality of the cut sheets can be exposed for the image data combined in correspondence to the cut sheets of the light-sensitive material A arranged in the plurality of rows.

In the digital photoprinter, the range in which a light beam is deflected in the main scanning direction for the exposure performed by the exposing unit 36 is generally 10 inches (245 mm) or 12 inches (304.8 mm) and the light deflector such as the polygonal mirror or the like scans the entire scanning range each time regardless of a print size.

On the other hand, since the size of the light-sensitive materials A is 102 mm wide×148 mm long in postcard and 89 mm×127 mm in L-size print, the digital photoprinter has a scanning range which is sufficient to simultaneously expose two postcards or three L-size prints (two in the case of 10 inches).

Further, the data processing apparatus of the input machine or the multi-image data combining unit 35 of the image recording section 16 can also freely perform image processing such as editing of printed images by combining a plurality of image, splitting a single image into plural images, color and density adjustment, edge enhancement and the like. Accordingly, the exposing unit 36 which receives the output image data having been subjected to the above editing and image processing to perform digital exposure can output the exposed material having the data freely edited and image-processed depending on their use as finished prints.

Thus, in the embodiment, the image recording section 16 can perform exposure two or three times more effectively by transporting two or three sheets of light-sensitive material A by the scan/transport means 38 while arranging laterally, combining the images of the film which correspond to the same two or three sheets of light-sensitive material by the exposing unit 36 and simultaneously performing scan exposure.

At the time, when a plurality of cut sheets of the light-sensitive material to be exposed at the same time have different lengths or when the cut sheets of light-sensitive material having the same length are exposed while being transported without being aligned (without aligning the forward ends thereof), there is a possibility that any cut sheets of the light-sensitive material such as a shorter cut sheet may affect the transport of other cut sheets of the light-sensitive material being exposed such as a longer cut sheet of the light-sensitive material when entering or passing through the transport roller pairs 40, 42, whereby uneven exposure occurs. However, the occurrence of the uneven exposure can be perfectly prevented when the light-sensitive material is cut to the same length and only the cut sheets of light-sensitive material which have the same length and whose forward ends are aligned are used as shown in FIG. 2.

However, in the case where cut sheets of different length or cut sheets of same length which are not aligned do not affect so much other cut sheets being exposed, or do not cause an important unevenness in exposure, or do not raise a very serious problem in uneven exposure when entering or passing through the transport roller pairs 40 and 42, they can be simultaneously exposed, thereby improving the productivity. In particular, when the cut sheets of different length are simultaneously exposed, the forward ends thereof can be aligned and transported for simultaneous exposure as shown in FIG. 3, thereby achieving the speed-up of the processing.

When a plurality of cut sheets of the light-sensitive material are simultaneously exposed, the same image may be used repeatedly as in postcards or different images may be used as in L-size prints in ordinary photo printing.

FIG. 2 and FIG. 3 are conceptual views showing the main processes in the embodiment of FIG. 1 in an expanded mode. FIG. 2 shows a case where a light-sensitive material is cut to the cut sheets of same length and FIG. 3 shows a case where a light-sensitive material is cut to the cut sheets of different length. In FIG. 2, the elongated light-sensitive material A supplied from the magazine 24 (26) is cut to a specified same length by the cutter 32 (34); the cut sheets of the light-sensitive material are distributed in a plurality of rows (three rows in the embodiment) by the distributor 18; and then supplied to the exposing position (scanning line) X while being pinched between the transport roller pair 40 of the scan/transport means 38. At the exposing position X, the cut sheets of the light-sensitive material A are exposed by scanning with the recording light Y in the exposing unit 36 and the cut sheets of the light-sensitive material A having been exposed are delivered to the next process or the developing apparatus 20 while being pinched between the transport roller pair 42.

In order to show that the magazines 24 (26), the cutters 32 (34), the distributor 18 and the image recording section 16 shown in FIG. 2 and FIG. 3 need not be provided successively, these figures show the above components with arrows inserted thereto.

It is preferable to provide as required a light-sensitive material transport mechanism or a buffer of the light-sensitive material A in the sections shown by the arrows.

Although the components are disposed vertically from the lower portion of the image recording apparatus 10 upwardly in an actual layout as shown in FIG. 1, FIG. 2 and FIG. 3 show the components in a single flat row for the convenience of explanation.

The cut sheets of the light-sensitive material which have been exposed in the image recording section 16 and which are in a plurality of rows overlapped in the transport direction are delivered to the developing apparatus 20 by a transport roller pair 54 through a delivery port 56 as shown in FIG. 1. When, for example, cut sheets of a silver salt photographic light-sensitive material are developed, specified developing steps such as color development, bleach/fixing, rinsing and so on are performed in the developing apparatus 20 in accordance with the light-sensitive material A and latent images are made visual images. Thereafter, the cut sheets of the light-sensitive material A are dried and output as finished prints, accumulated in a single row in the sequence of the images recorded on the film and delivered into a sorter or the like.

In the above embodiment, the cut sheets of the light-sensitive material are transported with the forward ends thereof being aligned whether they are same-sized or different-sized. When the forward ends are aligned, the image data of a plurality of images can be combined by the data processing apparatus of the input machine or can be easily combined by the multi-image data combining unit 35 of the image recording section 16 as described above, so that the simultaneous exposure for the plurality of images can be facilitated. However, the method of aligning the cut sheets of the light-sensitive material in a plurality of rows is not limited to the above alignment of the forward ends, and the forward ends of the cut sheets may not be aligned, or other aligning method may be employed.

When, for example, the forward ends of the cut sheets of the light-sensitive material are not aligned whether the cut sheets are same-sized or different-sized, a sensor, for example, an forward end sensor (not shown) for detecting the cut sheets of the light-sensitive material, must be provided for each of the plurality of rows of the light-sensitive material upstream of the transport roller pair 40. The distributor 18 appropriately distributes the cut sheets of the light-sensitive material having the same or a different length in the plurality of rows and transports them in this state. When the forward end sensors detect the forward ends of the cut sheets of the respective rows, the multi-image data combining unit 35 of the image recording section 16 receives the detection signals from the sensors and calculates exposure start line differences of a plurality of the images which will be recorded by exposure of the cut sheets of the respective rows, based on the differences of timing at which the cut sheets of the respective rows are detected (time differences of the detection signals), the transport speeds of the cut sheets of the light-sensitive material, the scanning cycle of the light beam and the transfer distances of the cut sheets of the light-sensitive material when they are transported to the exposing position X after being detected; combines the image data of the respective images based on the line differences; and sends the composite image data to the exposing unit 36. The exposing unit 36 can simultaneously expose the cut sheets of the light-sensitive material based on the supplied composite image data, whether the cut sheets are same-sized but non-aligned, or different-sized.

When all of the image data to be supplied for exposing the cut sheets of the light-sensitive material in the respective rows cannot be combined while the cut sheets of the respective rows are transported to the exposing position X after the forward ends thereof are detected by the forward end sensors, one complete composite image need not be always created. That is, it is also possible that the image data to be outputted for the cut sheets of the respective rows is prepared for each of a plurality of lines in accordance with the data combining capability of the multi-image data combining section 35 and the processing capability of the exposing unit 36 and stored in the toggle memories of the plurality of lines so that the exposing unit 36 sequentially reads the image data. Since the forward ends of the cut sheets are not aligned or the length of the cut sheets are different, the light with the image data is white, non-sensitive and non-luminous at the portions where the light-sensitive material does not exist, and effective image data capable of color formation is disposed only in the pixels at the portions where the light-sensitive material exists. As to the above lines, only the pixels at the portions where the image data exists is properly supplied for exposure of the cut sheets of the light-sensitive material by the exposing unit 36.

It is needless to say that when the cut sheets are same-sized, it is simplest and most preferable to align the forward ends thereof by the register rollers. However, the cut sheets may be transported and exposed in the above state that the forward ends are not aligned.

When the cut sheets are different-sized, the rear ends or central portions thereof may be aligned. When the rear ends are aligned, the transport rollers 40 do not function as the register rollers. Thus, register rollers are provided upstream of the transport rollers 40 as ordinary scan/transfer rollers and a turret is interposed between the register rollers and the transport rollers 40 to reverse the forward ends and the rear ends of the cut sheets. In this case, the forward ends of the cut sheets distributed in the plurality of rows are aligned by the register rollers and then reversed by the turret.

When the rear ends of the cut sheets of the light-sensitive material are aligned, the forward ends thereof are made irregular. At the time, a sensor is provided for each of the rows to detect the light-sensitive material to expose in the same manner as described above.

While the image recording apparatus of the present invention has been described above in detail, the present invention is by no means limited to the above embodiment and it goes without saying that various improvements and modifications can be made without departing from the gist of the present invention.

As described above in detail, the image recording apparatus of the present invention includes the cutter for cutting the elongated light-sensitive material to cut sheets having a specified length in the light-sensitive material supply section, the distributor for distributing the light-sensitive material cut to the cut sheets of the specified length in a plurality of rows, the scan/transport means for aligning and transporting the cut sheets of the light-sensitive material distributed in the plurality of rows and the exposing unit for performing simultaneous digital exposure for a plurality of images recorded on a film. Then, the image recording apparatus distributes the light-sensitive material supplied as the cut sheets having the specified length in the plurality of rows, aligns them and digitally exposes the cut sheets of the light-sensitive material distributed in the plurality of rows at the same time for the plurality of images recorded on the film.

Accordingly, the image recording apparatus of the present invention can simultaneously finish a plurality of prints by exposing a plurality of cut sheets of light-sensitive material at the same time, whereby the present invention is very effective in improving the productivity of the digital photoprinter when a multiplicity of cut sheets of light-sensitive material are exposed.

In particular, when the image recording apparatus is arranged to be additionally mounted on the digital photoprinter as an optional function, it can perform ordinary image processing as well as simultaneous finishing of a plurality of prints when only the same-sized cut sheets of the light-sensitive material are exposed in large quantity such as when postcards and L-size prints are made in large quantity, whereby furthermore remarkable effects can be obtained by the present invention.

What is claimed is:

1. An image recording apparatus, comprising:
   a light-sensitive material supply section for accommodating an elongated roll-shape light-sensitive material and supplying a light-sensitive material having been cut as cut sheets of a specified length;
   a light-sensitive material transport mechanism for transporting the cut sheets of th light-sensitive material along a specified transport passage;

an image recording section provided in the specified transport passage of the light-sensitive material transport mechanism for digitally exposing the cut sheets of said light-sensitive material for a plurality of images;

a cutter provided in said light-sensitive material supply section for cutting the elongated light-sensitive material to the cut sheets of the light-sensitive material;

a distributor provided in the specified transport passage for distributing the cut sheets of the light-sensitive material in a plurality of rows;

scan/transport means provided in the image recording section for scanning and transporting the cut sheets of the light-sensitive material distributed in the plurality of rows; and an exposing unit provided in the image record section for digitally exposing the cut sheets of the light-sensitive material at a time for the plurality of images, wherein the light-sensitive material supplied as said cut sheets is distributed in the plurality of rows and digitally exposed at a time for said plurality of images and the exposed light-sensitive material is delivered to a subsequent developing apparatus by said light-sensitive material transport mechanism.

2. The image recording apparatus according to claim 1, further comprising aligning means for aligning the cut sheets of the light-sensitive material distributed in the plurality of rows by said distributor before the cut sheets of the light-sensitive material are digitally exposed by said image recording section.

3. The image recording apparatus according to claim 1, further comprising a detection sensor provided for each of the plurality of rows near to said image recording section on upstream side thereof for detecting the cut sheet of the light-sensitive material distributed by said distributor and transported by said light-sensitive material transport mechanism and image data combining means for combining the image data of the respective images to be supplied for exposing the cut sheets of the light-sensitive material distributed in said plurality of rows based on differences of timing at which the respective rows of the cut sheets of the light-sensitive material distributed in the plurality of rows are detected.

4. The image recording apparatus according to claim 1, wherein the specified images to be supplied for digitally exposing the cut sheets of said light-sensitive material by said image recording section include an image recorded on a film or an image recorded by a digital camera.

5. The image recording apparatus according to claim 1, wherein the specified images to be supplied for digitally exposing the cut sheets of said light-sensitive material by said image recording section include a composite image made by combining the image recorded on the film or the image recorded by the digital camera with an image and a character image which were previously prepared.

6. The image recording apparatus according to claim 1, wherein the light-sensitive material cut to the cut sheets is a light-sensitive material cut to cut sheets having the same specified length by said cutter.

7. The image recording apparatus according to claim 1, wherein the specified images to be supplied for digitally exposing the cut sheets of the light-sensitive material distributed in said plurality of rows at a time are identical.

8. The image recording apparatus according to claim 1, wherein the light-sensitive material cut to the cut sheets is a light-sensitive material cut to cut sheets for a postcard.

9. The image recording apparatus according to claim 1, wherein the specified images to be supplied for digitally exposing the cut sheets of the light-sensitive material distributed in said plurality of rows at a time are identical and the light-sensitive material cut to the cut sheets is a light-sensitive material cut to cut sheets having the same specified length for a postcard.

10. An image recording apparatus, comprising:

a magazine for storing a roll of a recording medium;

a cutter that receives a portion of said recording medium and cuts said portion of said recording medium to produce a plurality of cut sheets of said recording medium;

a distributor that receives a row of said cut sheets and distributes said row of said cut sheets into a plurality of rows of said cut sheets; and an exposing unit that receives said plurality of rows of said cut sheets and exposes said plurality of rows of said cut sheets to form a plurality of images.

11. The image recording apparatus according to claim 10, further comprising:

an aligning device, wherein said aligning device aligns said cut sheets in said plurality of rows of said cut sheets before said cut sheets are exposed by said exposing unit.

12. The image recording apparatus according to claim 10, further comprising:

a detection sensor, wherein said detection sensor detects positions of said cut sheets in said plurality of rows of said cut sheets; and an image data combing apparatus that combines image data for said plurality of images, wherein said exposing unit exposes said cut sheets based on said image data and based on said positions of said cut sheets detected by said detection sensor.

13. The image recording apparatus according to claim 10, wherein said plurality of images correspond to images recorded on a film.

14. The image recording apparatus according to claim 10, wherein said plurality of images correspond to images recorded by a digital camera.

15. The image recording apparatus according to claim 13, wherein said plurality of images include a composite image made by combining an image recorded on said film with an image that is previously prepared.

16. The image recording apparatus according to claim 14, wherein said plurality of images include a composite image made by combining an image recorded by said digital camera with an image that is previously prepared.

17. The image recording apparatus according to claim 10, wherein said cutter cuts said recording medium to produce said cut sheets such that said cut sheets have equal lengths.

18. The image recording apparatus according to claim 10, wherein said plurality of images formed on said plurality of said cut sheets are identical.

19. The image recording apparatus according to claim 10, wherein said cut sheets have dimensions corresponding to dimensions of a postcard.

20. The image recording apparatus according to claim 18, wherein said cut sheets have dimensions corresponding to dimensions of a postcard.

21. The image recording apparatus according to claim 18, wherein said exposing unit simultaneously exposes current cut sheets respectively contained in said plurality of rows to produce said plurality of images on said current cut sheets, wherein said plurality of images on said current cut sheets are identical.

* * * * *